United States Patent [19]

Chen

[11] Patent Number: 5,438,915
[45] Date of Patent: Aug. 8, 1995

[54] TEMPERATURE SENSOR ASSEMBLY FOR AN AUTOMATIC BAKING MACHINE

[76] Inventor: Shang-Hsien Chen, No.27, Sec.3, Chung-Shan Rd., Tan-Tzu Hsiang, Taichung Hsien, Taiwan

[21] Appl. No.: 187,987

[22] Filed: Jan. 28, 1994

[51] Int. Cl.⁶ .................. A21D 8/00; A47J 27/00; A47J 37/00; A47J 43/046
[52] U.S. Cl. .................. 99/331; 99/348; 99/468; 366/98; 366/145; 366/146
[58] Field of Search .................. 99/325–328, 99/329 R, 331–333, 337, 338, 348, 352, 353, 467, 468, 483, 484, 486; 366/69, 96–98, 144–147, 601; 426/504, 512

[56] References Cited

U.S. PATENT DOCUMENTS

| | | | |
|---|---|---|---|
| 4,538,509 | 9/1985 | Ojima et al. | 99/348 |
| 4,762,057 | 8/1988 | Hirota et al. | 99/468 X |
| 4,776,265 | 10/1988 | Ojima | 99/468 X |
| 4,903,587 | 2/1990 | Nagasaka et al. | 99/348 X |
| 4,903,588 | 2/1990 | Horiuchi et al. | 366/98 X |
| 4,903,589 | 2/1990 | Aoyama | 366/145 X |
| 4,951,559 | 8/1990 | Arao et al. | 366/146 X |
| 4,957,040 | 9/1990 | Nakakura et al. | 99/331 X |
| 5,019,972 | 5/1991 | Rim | 99/331 |

FOREIGN PATENT DOCUMENTS 8809640 12/1988 WIPO .................. 99/348

Primary Examiner—Timothy F. Simone
Attorney, Agent, or Firm—Lowe, Price, LeBlanc & Becker

[57] ABSTRACT

A temperature sensor assembly is used for an automatic baking machine which includes an oven and a container disposed within the oven so as to bake bread therein. The oven has a heat device mounted therein so as to heat the container. The temperature sensor assembly includes a shell member, a sensor element, a bias unit, and a housing member. The shell member is attached to the inner wall of the oven and has a heat transfer portion near the container. The heat transfer portion is made of a material which permits heat to transfer therethrough. The sensor element contacts the heat transfer portion of the shell member so as to detect a temperature of the heat transfer portion, and has a pair of conducting legs respectively adapted to be connected electrically to two conducting wires of the heat device so as to signal and actuate the heat device to heat the container when the temperature of the heat transfer portion is below a predetermined temperature. The bias unit biases the sensor element to press against the heat transfer portion of the shell member. The housing member is coupled with the shell member so as to retain the bias unit therebetween and is attached to the inner wall of the oven so as to position the temperature sensor assembly on the oven.

2 Claims, 7 Drawing Sheets

TEMPERATURE SENSOR ASSEMBLY FOR AN AUTOMATIC BAKING MACHINE

BACKGROUND OF THE INVENTION

1. Field of the Invention

This invention relates to a temperature sensor assembly for an automatic baking machine, more particularly to a temperature sensor assembly which can detect precisely the temperature inside the oven of the automatic baking machine so as to signal the heat device of the automatic baking machine to perform an appropriate adjustment for the oven.

2. Description of the Related Art

The improvement of this invention is directed to a conventional temperature sensor assembly 10 which is installed in an automatic baking machine 1, as shown in FIG. 1. The automatic baking machine 1 includes an oven 11 with a hole 111 formed through a vertical wall thereof, and a container 12 disposed within the oven 11 so as to bake bread therein. The oven 11 has a heat device 112 mounted therein and capable of heating the container 12 according to the signal generated by the temperature sensor assembly 10.

Referring to FIGS. 2 and 3, the temperature sensor assembly 10 includes a hollow receiving unit 101, a positioning member 102, a U-shaped insulated sleeve 103, a sensor member 104, and a shell member 105.

The receiving unit 101 includes a positioning plate 1011 which is connected threadably to the vertical wall of the oven 11 (see FIG. 1), and a housing 1012 which is mounted securely on the positioning plate 1011 and which has an opening in alignment with the hole 111 of the oven 11 (see FIG. 1). An elongated passage 106 is communicated with the housing 1012 of the receiving unit 101 so as to allow a pair of conducting wires 113 to extend therethrough. The conducting wires 113 are adapted to connect electrically with a control system (not shown) of the automatic baking machine 1 so as to actuate the heating device 112 in order to heat the container 12 (see FIG. 1) when the temperature inside the container 12 is below a predetermined temperature.

The positioning member 102 includes a block 1021 which is located in the housing 1012 and which has a notch 1022 (as best shown in FIG. 4) formed in a surface thereof, and a pair of lugs 1023 which respectively project outward from the intermediate sections of the opposite side walls of the block 1021. The notch 1022 has a semicircular cross-sectional surface so as to hold the intermediate portion of the insulated sleeve 103 in the notch 1022 (as shown in FIG. 4). Each of lugs 1023 has a positioning hole 1024 formed therethrough so as to allow two end portions of the insulated sleeve 103 to extend respectively through the positioning holes 1024 of the lugs 1023, thereby positioning the insulated sleeve 103 on the positioning member 102.

The sensor element 104 includes a cylindrical sensing portion 1041 which is inserted fittingly into the intermediate portion of the insulated sleeve 103, and two conducting legs 1042 which extend respectively through the end portions of the insulated sleeve 103 and which are connected respectively and electrically to the conducting wires 113. The insulated sleeve 103 can prevent the conducting legs 1042 from contacting other conducting materials in order to maintain the precision of the sensor element 104.

The shell member 105 is coupled with the housing 1012 of the receiving unit 101 and extends through the hole 111 of the oven 11 (see FIG. 1). The shell member 105 has a heat transfer portion 1051 near the container 12 (see FIG. 1). The heat transfer portion 1051 is made of a heat-conductive material, and presses against the intermediate portion of the insulated sleeve 103 so as to position the positioning member 102 and the insulated sleeve 103 between the shell member 105 and the housing 1012. Because of its proximity to the container 12, the heat transfer portion 1051 can transmit heat inside the container 12 to the sensing portion 1041 via the intermediate portion of the insulated sleeve 103 quickly. By means of the conducting legs 1042 and the conducting wires 113, the sensing portion 1041 can signal the control system of the automatic baking machine 1 so as to actuate the heat device 112 to heat the container 12, as shown in FIG. 1.

The drawbacks of the conventional temperature sensor assembly 10 are as follows:

1. The size of each part of the sensor assembly 10 has to be designed as small as possible in order to achieve a shorter reaction time. However, when positioned on the wall of the oven 11, the block 1021 of the positioning member 102 is likely to tilt to a side wall of the shell member 105, as shown in FIG. 5. As a result, the intermediate portion of the insulated sleeve 103 deviates from its original position. This may affect the precision of the sensor element 104.

2. In order to prevent the sensing portion 1041 of the sensor element 104 from being crushed as a result of the heat transfer portion 1051 of the shell member 105 pressing directly against the sensing portion 1041, the insulated sleeve 103 must be sleeved on the sensing portion 1041 of the sensor element 104. However, the insulated sleeve 103 may delay the heat transfer speed from the heat transfer portion 1051 to the sensing portion 1041 of the sensor element 104. This also affects the precision of the sensor element 104.

SUMMARY OF THE INVENTION

The main objective of this invention is to provide a temperature sensor assembly which is installed in an automatic baking machine and which can detect precisely the temperature inside the oven of the automatic baking machine so as to signal the heat device of the automatic baking machine to perform an appropriate adjustment for the oven.

According to this invention, a temperature sensor assembly is installed in an automatic baking machine which includes an oven and a container disposed within the oven so as to bake bread therein. The oven has a heat device mounted therein so as to heat the container. The temperature sensor assembly includes a shell member, a sensor element, a bias unit, and a housing member. The shell member is attached to the inner wall of the oven and has a heat transfer portion near the container. The heat transfer portion is made of a material which permits heat to transfer therethrough. The sensor element contacts the heat transfer portion of the shell member so as to detect a temperature of the heat transfer portion, and has a pair of conducting legs respectively adapted to be connected electrically to two conducting wires of the heat device so as to signal and actuate the heat device to heat the container when the temperature of the heat transfer portion is below a predetermined temperature. The bias unit biases the sensor element to press against the heat transfer portion of the shell member. The housing member is coupled with the shell member so as to retain the bias unit therebetween and is attached to the inner wall of the oven so as to position the temperature sensor assembly on the oven.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
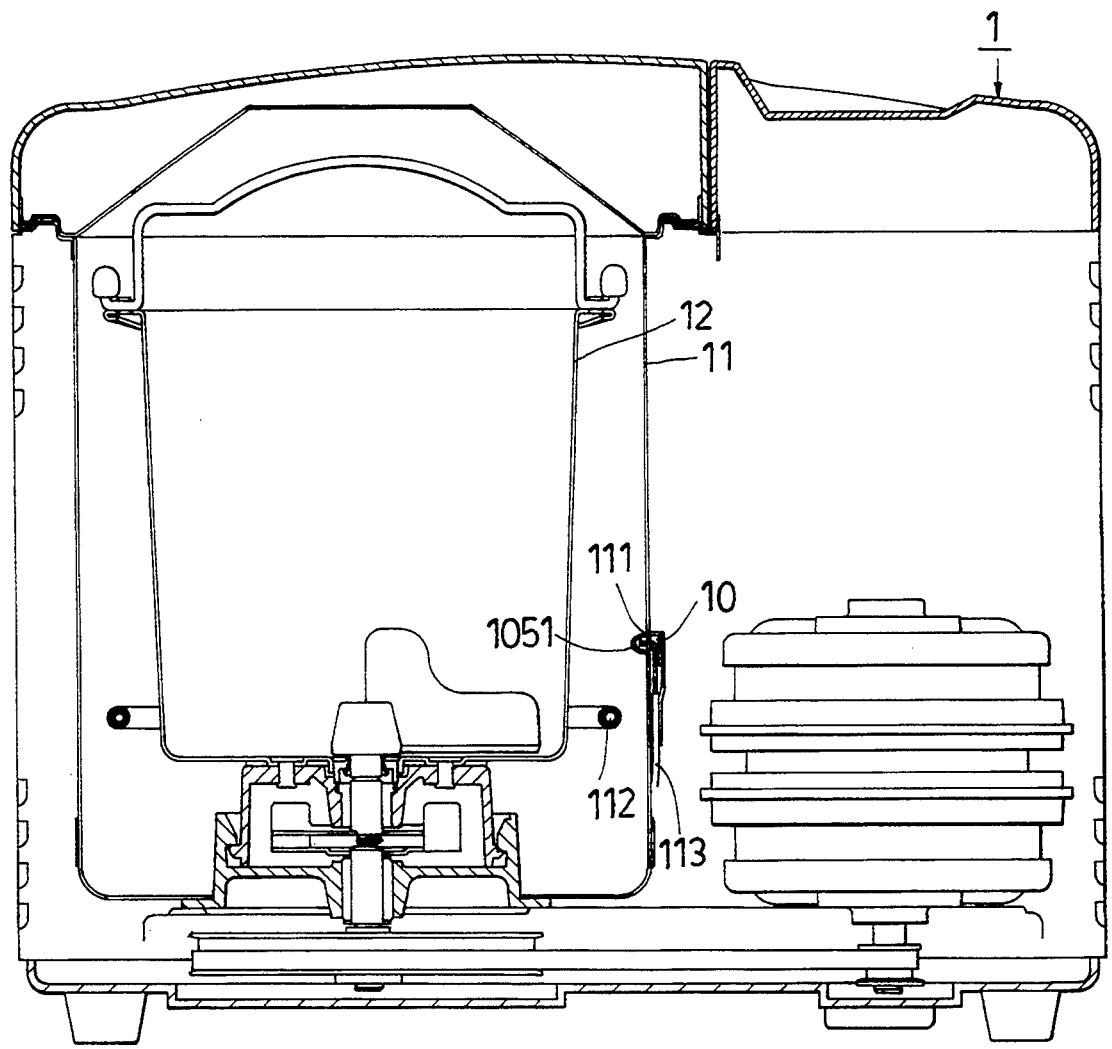
FIG. 1 is a schematic view illustrating a conventional automatic baking machine.
Figure 2:
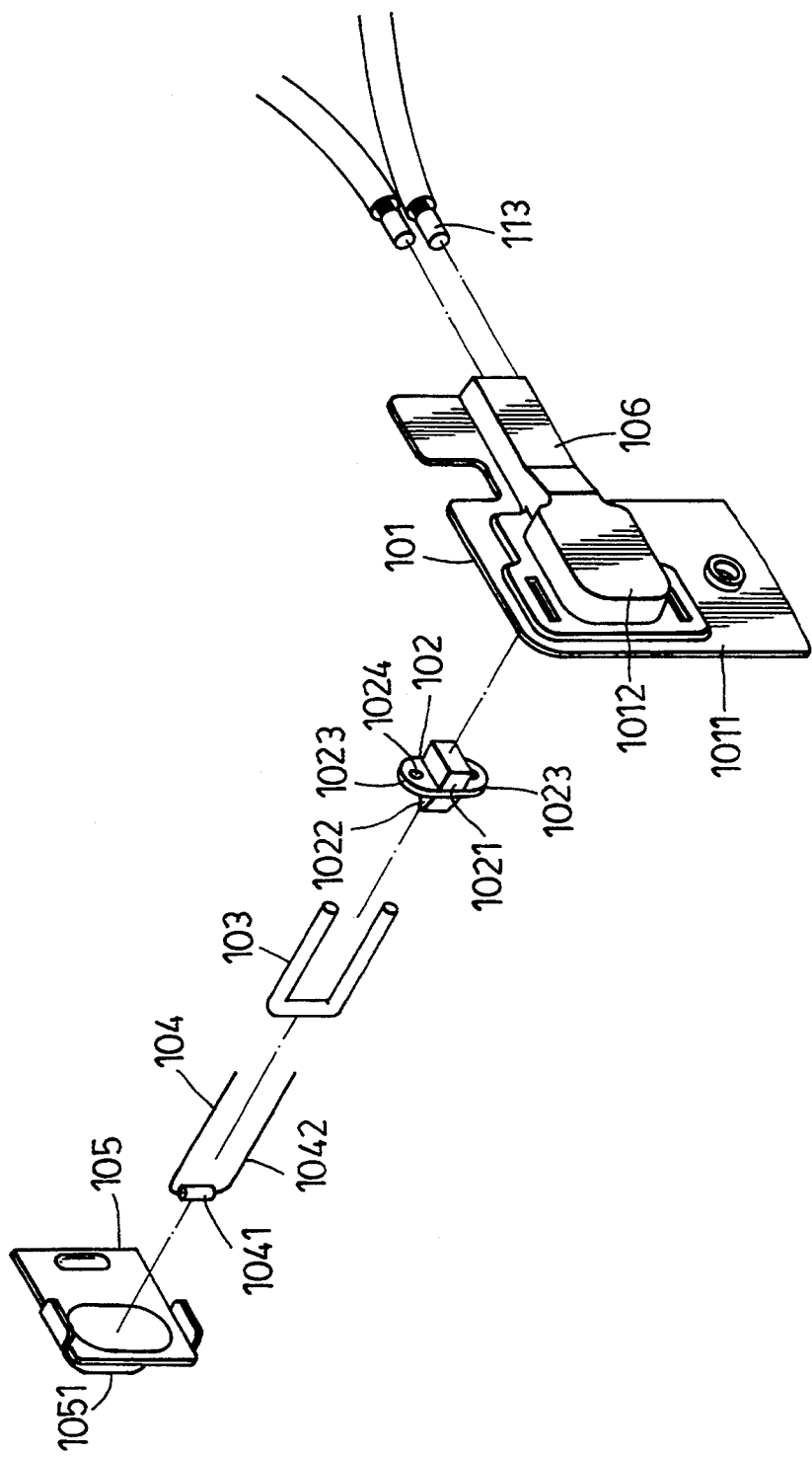
FIG. 2 is an exploded view showing the temperature sensor assembly of the conventional automatic baking machine.
Figure 3:
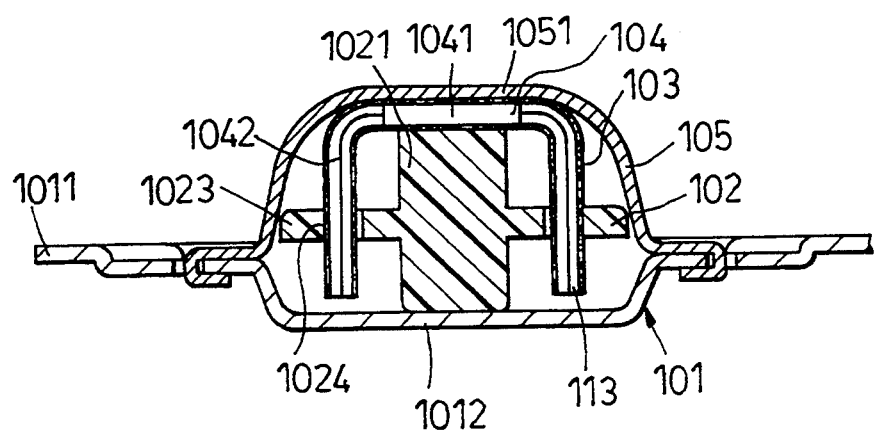
FIG. 3 shows a longitudinal section of the temperature sensor assembly of the conventional automatic baking machine.
Figure 4:
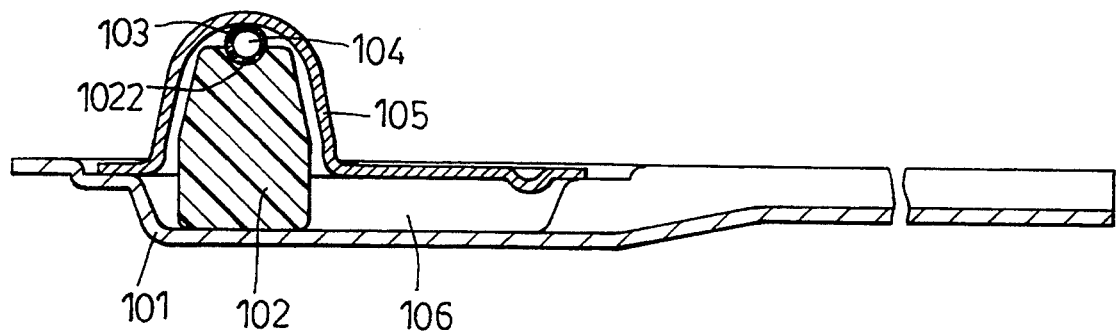
FIG. 4 shows a cross section of the temperature sensor assembly of the conventional automatic baking machine.
Figure 5:
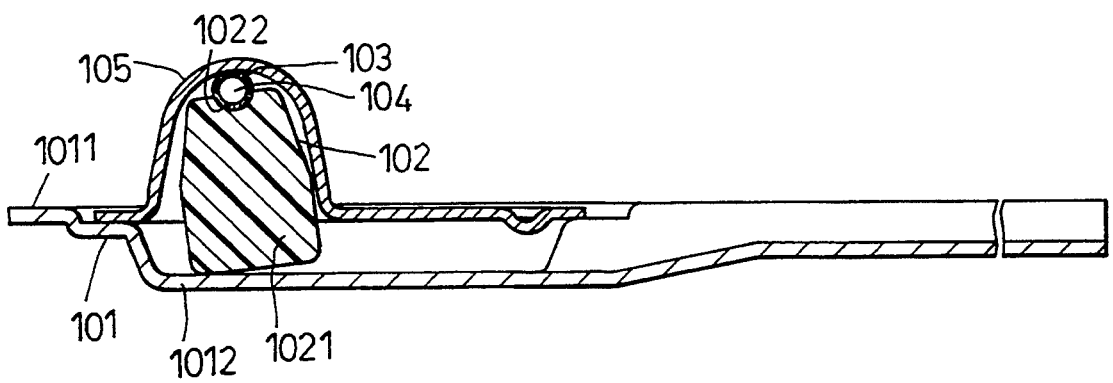
FIG. 5 is a schematic view illustrating one of the drawbacks when the temperature sensor assembly of the conventional automatic baking machine is in use.
Figure 6:
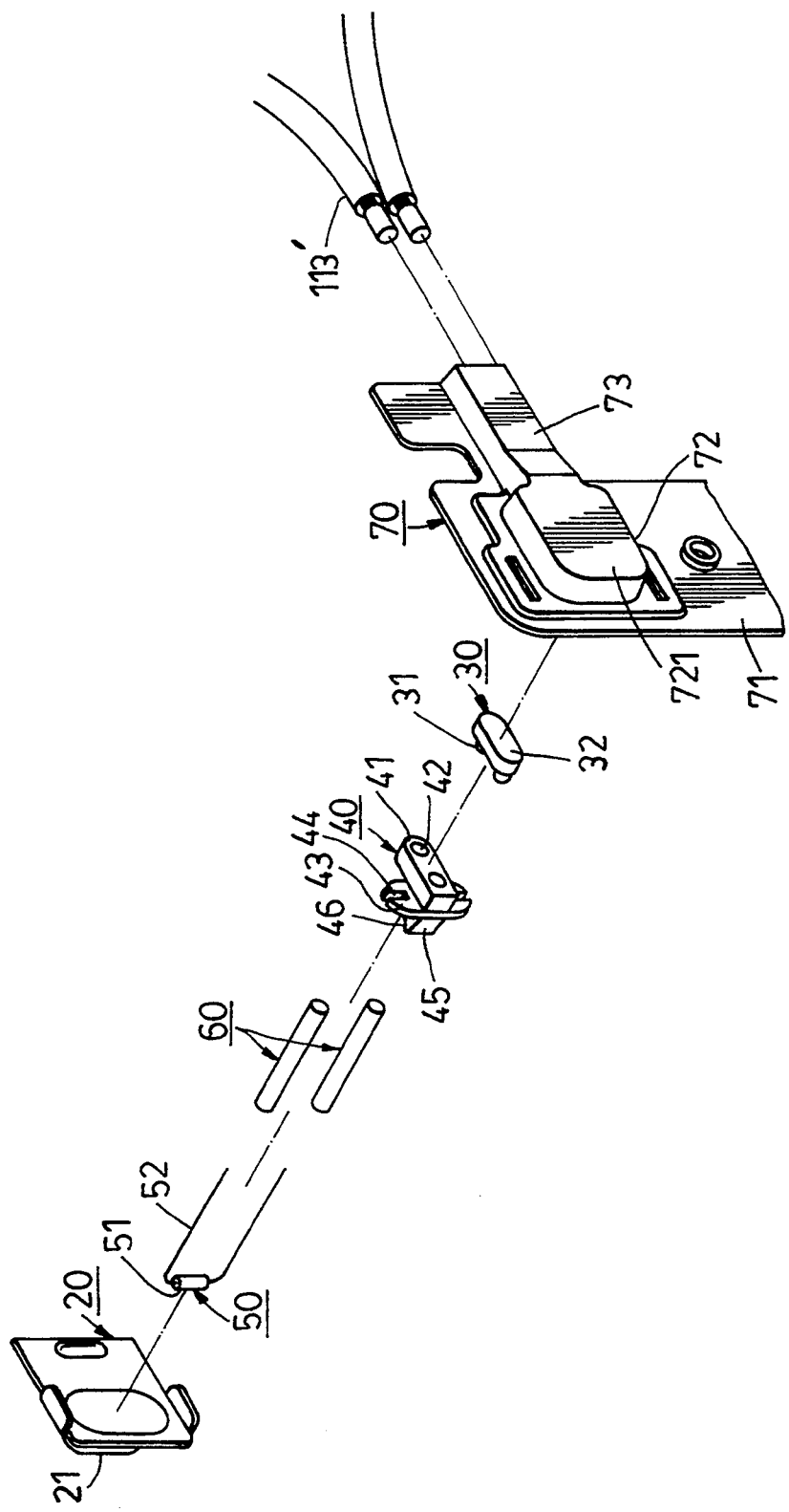
FIG. 6 is an exploded view showing a temperature sensor assembly of this invention.
Figure 8:
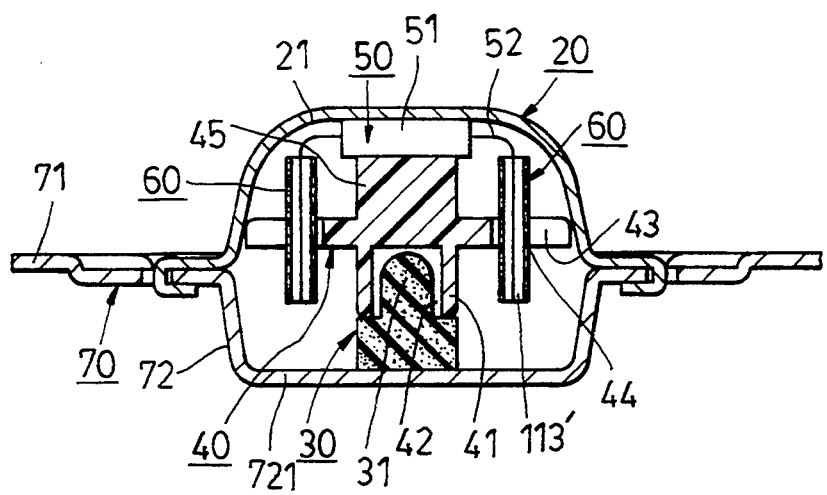
FIG. 8 shows a longitudinal section of the temperature sensor assembly according to this invention.
Figure 9:
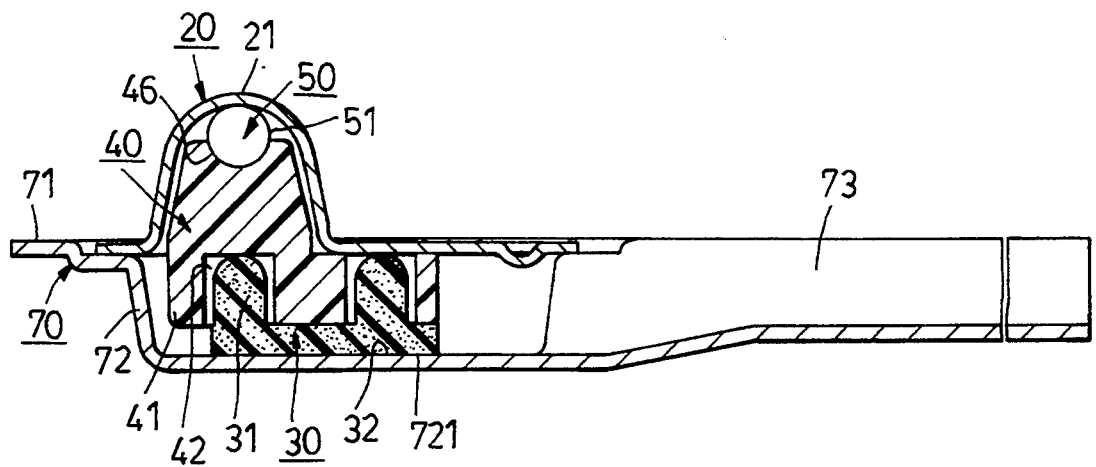
FIG. 9 shows a cross section of the temperature sensor assembly of this invention.

FIGS. 6, 8, and 9 show the preferred embodiment of the temperature sensor assembly of the automatic baking machine according to this invention. The automatic baking machine is similar in construction to the conventional automatic baking machine of FIG. 1 except for the temperature sensor assembly. Referring to FIG. 1, the automatic baking machine 1 includes an oven 11 and a container 12 which is disposed within the oven 11 so as to bake bread therein. The oven 11 has a hole 111 formed through a vertical wall thereof so as to allow the temperature sensor assembly of this invention to be inserted into the hole 111, and a heat device 112 mounted therein so as to heat the container 12 according to the signal generated by the temperature sensor assembly.

Referring to FIGS. 6 and 8, the temperature sensor assembly includes a shell member 20, an elongated cushion member 30, a positioning member 40, a sensor element 50, a pair of insulated sleeves 60, and a hollow receiving unit 70.

The shell member 20 extends through the hole 111 of the oven 11 (see FIG. 1) and has a heat transfer portion 21 near the container 12 (see FIG. 1). The heat transfer portion 21 is a plate body and is made of a heat-conductive material which permits heat inside the container 12 to transfer therethrough.

The sensor element 50 has a cylindrical sensing portion 51 which contacts the heat transfer portion 21 of the shell member 20 so as to detect a temperature of the heat transfer portion 21, and a pair of conducting legs 52 respectively adapted to connect electrically with two conducting wires 113' (which are similar to the conducting wires 113 shown in FIG. 1) so that the sensor element 50 signals and actuates the heat device 112 in a known manner to heat the container 12 (see FIG. 1) when the temperature of the heat transfer portion 21 is below a predetermined temperature.

Figure 7:
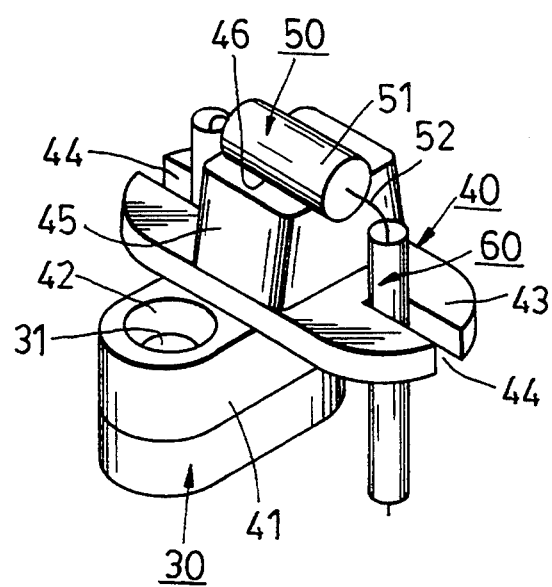
FIG. 7 is a perspective view showing the bias unit and the sensor element of the temperature sensor assembly of this invention, the sensor element being disposed on the bias unit so as to be pushed to press against the heat transfer portion of the shell member of the temperature sensor assembly.

Referring to FIG. 7, the positioning member 40 includes a block body 45 which has a notch 46 of a semicircular cross-section formed in a surface thereof so as to hold the sensing portion 51 of the sensor element 50 in the notch 46. An elongated plate body 43 is mounted securely on another surface of the block body 45 opposite to the notch 46 and has two slots 44 respectively formed in two end portions thereof so as to allow the insulated sleeves 60 to extend respectively through the slots 44 and then allow the same to be positioned on the plate body 43. The conducting legs 52 of the sensor element 50 extend respectively through the insulated sleeves 60 so as to avoid contact with other conducting materials, and are then connected electrically to the conducting wires 113'. An elongated sleeve body 41 is mounted securely on the plate body 43 and has two positioning holes 42 (only one can be seen) formed through the sleeve body 41.

The elongated cushion member 30 is made of hard rubber and has two rods 31, as shown in FIG. 9, which project from a surface of the cushion member 30 into the positioning holes 42 of the sleeve body 41 of the positioning member 40. The positioning holes 42 and the rods 31 together constitute a connection mechanism so as to interconnect the cushion member 30 and the positioning member 40. The assembly of the positioning member 40, the cushion member 30, and the connection mechanism constitutes a bias unit which is capable of biasing the sensing portion 51 of the sensor element 50 to press against the heat transfer portion 21 of the shell member 20. Because it is made of a hard rubber material, the cushion member 30 can effectively push the positioning member 40 to press the sensing portion 51 against the heat transfer portion 21 of the shell member 20 and can prevent the sensing portion 51 from being crushed as a result of the heat transfer portion 21 and the positioning member 40 squeezing the sensing portion 51 of the sensor element 50. Accordingly, there is no need to sleeve the insulated sleeve 60 on the sensing portion 51 to avoid the latter from being crushed. As a result, the sensing portion 51 can effectively detect the temperature of the heat transfer portion 21, thereby increasing the precision of the sensor element 50.

Referring again to FIG. 6, the receiving unit 70 has a positioning plate 71, a housing member 72 which is mounted securely on the positioning plate 71, and an elongated passage 73 which is communicated with the housing member 72 so as to allow the conducting wires 113' to extend therethrough. The housing member 72 is coupled with the shell member 20, as shown in FIG. 8, so as to retain the bias unit therebetween. The positioning plate 71 is connected threadably to the inner wall of the oven 11 (see FIG. 1) so as to position the temperature sensor assembly on the oven 11.

Referring to FIG. 9, because the cushion member 30 has an elongated surface 32 which abuts against the wall 721 of the housing member 72, the positioning member 40 does not tilt to a side wall of the shell member 20. Accordingly, the sensing portion 51 can be located at its original position so as to effectively detect the temperature of the heat transfer portion 21 of the shell member 20.

With this invention thus explained, it is apparent that numerous modifications and variations can be made without departing from the scope and spirit of this invention. It is therefore intended that this invention be limited only as indicated in the appended claims.

I claim:

1. A temperature sensor assembly for an automatic baking machine, said automatic baking machine including an oven and a container disposed within said oven so as to bake bread therein, said oven having a heat device mounted therein so as to heat said container, said temperature sensor assembly comprising:

a shell member attached to an inner wall of said oven and having a heat transfer portion near said container, said heat transfer portion being made of a material which permits heat to transfer therethrough;.

a sensor element contacting said heat transfer portion of said shell member so as to detect a temperature of said heat transfer portion, and having a pair of conducting legs respectively adapted to be connected electrically to two conducting wires of said heat device, said sensor element signaling and actuating said heat device to heat said container when the temperature of said heat transfer portion is below a predetermined temperature;

a bias unit biasing said sensor element to press against said heat transfer portion of said shell member; and a housing member coupling with said shell member so as to retain said bias unit therebetween, said housing member being attached to said inner wall of said oven so as to position said temperature sensor assembly on said oven, wherein said bias unit includes an elongated cushion member, a positioning member and a connection mechanism interconnecting said cushion member and said positioning member, said positioning member having a notch of a semicircular cross-section formed in a surface thereof so as to hold said sensor element in said notch, said cushion member being made of a hard rubber material so as to push said positioning member to press said sensor element against said heat transfer portion of said shell member.

2. A temperature sensor assembly as claimed in claim 1, wherein said connection mechanism includes two positioning holes formed in said positioning member, and two rods projecting from said cushion member and extending respectively into said positioning holes.

* * * * *